United States Patent
Kim et al.

(10) Patent No.: US 9,118,061 B2
(45) Date of Patent: Aug. 25, 2015

(54) SECONDARY BATTERY

(75) Inventors: Yongsam Kim, Yongin-si (KR); Sangwon Byun, Yongin-si (KR); Byungkyu Aiin, Yongin-si (KR)

(73) Assignees: SAMSUNG SDI CO., LTD., Yongin-si, Gyeonggi-do (KR); ROBERT BOSCH GmbH, Stuttgart (DE)

(*) Notice: Subject to any disclaimer, the term of this patent is extended or adjusted under 35 U.S.C. 154(b) by 148 days.

(21) Appl. No.: 13/196,341

(22) Filed: Aug. 2, 2011

(65) Prior Publication Data
US 2012/0040214 A1  Feb. 16, 2012

Related U.S. Application Data

(60) Provisional application No. 61/373,616, filed on Aug. 13, 2010.

(51) Int. Cl.
*H01M 2/12* (2006.01)
*H01M 2/02* (2006.01)

(52) U.S. Cl.
CPC .......... *H01M 2/1241* (2013.01); *H01M 2/0217* (2013.01)

(58) Field of Classification Search
CPC .......................... H01M 2/1241; H01M 2/0217
USPC .......... 429/56, 53, 57, 58, 60, 61, 66, 54, 72; 439/206
See application file for complete search history.

(56) References Cited

U.S. PATENT DOCUMENTS

| | | | |
|---|---|---|---|
| 7,140,380 B2 | 11/2006 | Marubayashi et al. | |
| 7,687,188 B2 | 3/2010 | Marubayashi et al. | |
| 2001/0027807 A1 | 10/2001 | Morishita et al. | |
| 2002/0006542 A1* | 1/2002 | Park et al. | 429/72 |
| 2003/0157404 A1* | 8/2003 | Inoue et al. | 429/175 |
| 2005/0069760 A1* | 3/2005 | Somatomo | 429/56 |
| 2005/0112455 A1 | 5/2005 | Marubayashi et al. | |
| 2007/0059586 A1* | 3/2007 | Matsumoto et al. | 429/53 |
| 2010/0233520 A1 | 9/2010 | Suzuki et al. | |
| 2011/0008654 A1 | 1/2011 | Kim et al. | |
| 2011/0269000 A1 | 11/2011 | Suzuki et al. | |

FOREIGN PATENT DOCUMENTS

| | | | |
|---|---|---|---|
| CN | 1427488 A | 7/2003 | |
| CN | 1604357 A | 4/2005 | |
| GB | 1 415 708 | 11/1973 | |
| GB | 1415708 * | 11/1975 | F16K 17/16 |
| JP | 58-32352 * | 8/1981 | H01M 2/02 |
| JP | 06-196139 A | 7/1994 | |

(Continued)

OTHER PUBLICATIONS

ModelingMadness (Antique plane 1938, Posted Oct. 13, 2011 {http://modelingmadness.com/scott/preww2/p24b.htm}).*

(Continued)

*Primary Examiner* — Patrick Ryan
*Assistant Examiner* — Aaron Greso
(74) *Attorney, Agent, or Firm* — Lee & Morse, P.C.

(57) ABSTRACT

A battery, including a housing defining an interior space, the housing including a safety vent, the safety vent having a concave shape such that a central portion of the safety vent protrudes toward the space, a region of the safety vent that protrudes farthest toward the space being about midway between peripheral edges of the safety vent.

19 Claims, 5 Drawing Sheets

(56) References Cited

FOREIGN PATENT DOCUMENTS

| | | | | |
|---|---|---|---|---|
| JP | H09-245759 | * | 9/1997 | ............ H01M 2/12 |
| JP | 2000-348700 A | | 12/2000 | |
| JP | 2005-071836 A | | 3/2005 | |
| JP | 2008-117605 A | | 5/2008 | |
| JP | 2008-235082 | * | 10/2008 | ............ H01M 2/12 |
| JP | 2008-235082 A | | 10/2008 | |
| JP | 2010-049883 A | | 3/2010 | |
| JP | 2010-165590 A | | 7/2010 | |
| KR | 10-1999-0046355 A | | 7/1999 | |
| KR | 10-2001-0089144 A | | 9/2001 | |
| KR | 10-2005-0041934 A | | 5/2005 | |
| KR | 10-2007-0056424 A | | 6/2007 | |
| KR | 10 2010-0041472 A | | 4/2010 | |
| WO | WO 2010/087040 A1 | | 8/2010 | |

OTHER PUBLICATIONS

NationMaster (NationMaster.com © 2005 [taken as Dec.] {http://www.nationmaster.com/encyclopedia/Trapazoid}).*
Korean Office Action in KR 10-2011-0080579, dated Apr. 29, 2013 (Kim, et al.).
Japanese Office Action in JP 2011-175771, dated Jul. 2, 2013 (Kim, et al.).
European Search Report in EP 11177359.4-1359, dated Jun. 19, 2013 (Kim, et al.).
Chinese Office Action in CN 201110234054.0, dated Oct. 28, 2013, with English translation (Kim, et al.).
Notification of Notice of Allowance mailed Jul. 8, 2014 in corresponding Japanes Patent Application No. 2011-175771.
European Office Action dated Feb. 17, 2014.

* cited by examiner

SECONDARY BATTERY

The present application claims priority under 35 U.S.C. §119(e) to U.S. Provisional Application No. 61/373,616, filed on Aug. 13, 2010, and entitled: "Secondary Battery," which is incorporated herein by reference in its entirety.

FIELD

Embodiments relate to a secondary battery.

DESCRIPTION OF THE RELATED ART

A secondary battery may be charged and discharged. In case of a low capacity battery, in which one battery cell is packaged into a pack shape, the low capacity battery may be used as a power source for various portable small electronic devices such as mobile phones, camcorders, etc. In case of a high capacity battery, in which several or tens of battery cells are connected in series or in parallel, the high capacity battery may be used as a power source for driving motors such as electric scooters, hybrid electric vehicles, electric vehicles, etc. The secondary battery may be manufactured in various shapes, such as a cylindrical shape, a prismatic shape, etc.

SUMMARY

An embodiment is directed to a battery, including a housing defining an interior space, the housing including a safety vent, the safety vent having a concave shape such that a central portion of the safety vent protrudes toward the space, a region of the safety vent that protrudes farthest toward the space being about midway between peripheral edges of the safety vent.

The safety vent may include an angled portion at the central portion.

A first groove may be located in the angled portion.

The first groove may be disposed in an outer surface of the safety vent and extend in a first direction of the safety vent.

The first groove may have a U-shape, a V-shape, or an inverted trapezoidal shape.

First regions of the safety vent may extend laterally from the angled portion, second regions of the safety vent may extend from the first regions, the first regions may meet at the angled portion with a relatively small angle between the first regions, the relatively small angle being determined at an outer surface of the safety vent, the second regions may meet the first regions, and a relatively large angle may be between the second regions, the relatively small angle being less than the relatively large angle, the relatively large angle being determined at the outer surface of the safety vent.

First regions of the safety vent may extend laterally from the angled portion, and second regions of the safety vent may extend laterally from the periphery of the safety vent towards central portion.

The first regions may meet at the angled portion with a relatively small angle between the first regions, the relatively small angle being determined at an outer surface of the safety vent, and the second regions may have a relatively large angle between the second regions, the relatively large angle being determined at the outer surface of the safety vent, the relatively small angle being less than the relatively large angle.

Respective second grooves may be located at lateral portions of the second regions.

The second grooves may have a U-shape, a V-shape, or an inverted trapezoidal shape.

The second grooves may extend in a first direction of the safety vent, and a first groove may be located in the angled portion and extend in the first direction of the safety vent.

The second regions may meet the first regions, the second grooves may be located where the second regions meet the first regions, and may be disposed in an outer surface of the safety vent, and the first groove may be disposed in the outer surface of the safety vent.

The safety vent may include two end plates, each end plate joining ends of the first and second regions to the periphery of the safety vent.

A first groove may be located in the angled portion, respective second grooves may be located at lateral portions of the second regions, and the two end plates may meet respective ends of the first groove.

The end plates may not meet the second grooves.

Each of the first regions may be substantially planar, and each of the second regions may be substantially planar.

Each of the first regions may be curved, and each of the second regions may be curved.

The safety vent may have a cross-sectional profile having a gull-wing shape, in which inner sections extend from the central portion, the inner sections being angled toward a periphery of the safety vent by a first angle, and outer sections extend from the inner sections to the periphery, the outer sections being angled toward the periphery by a second angle that is less than the first angle.

The inner sections and the outer sections may have thicknesses less than a thickness of the periphery.

The housing may include a case and a cap plate, the safety vent being disposed in the cap plate, the cap plate closing an end of the case.

DETAILED DESCRIPTION

Example embodiments will now be described more fully hereinafter with reference to the accompanying drawings; however, they may be embodied in different foams and should not be construed as limited to the embodiments set forth herein. Rather, these embodiments are provided so that this disclosure will be thorough and complete, and will fully convey the scope of the invention to those skilled in the art.

Hereinafter, a constitution of a secondary battery according to a first embodiment will be described.

Figure 1:
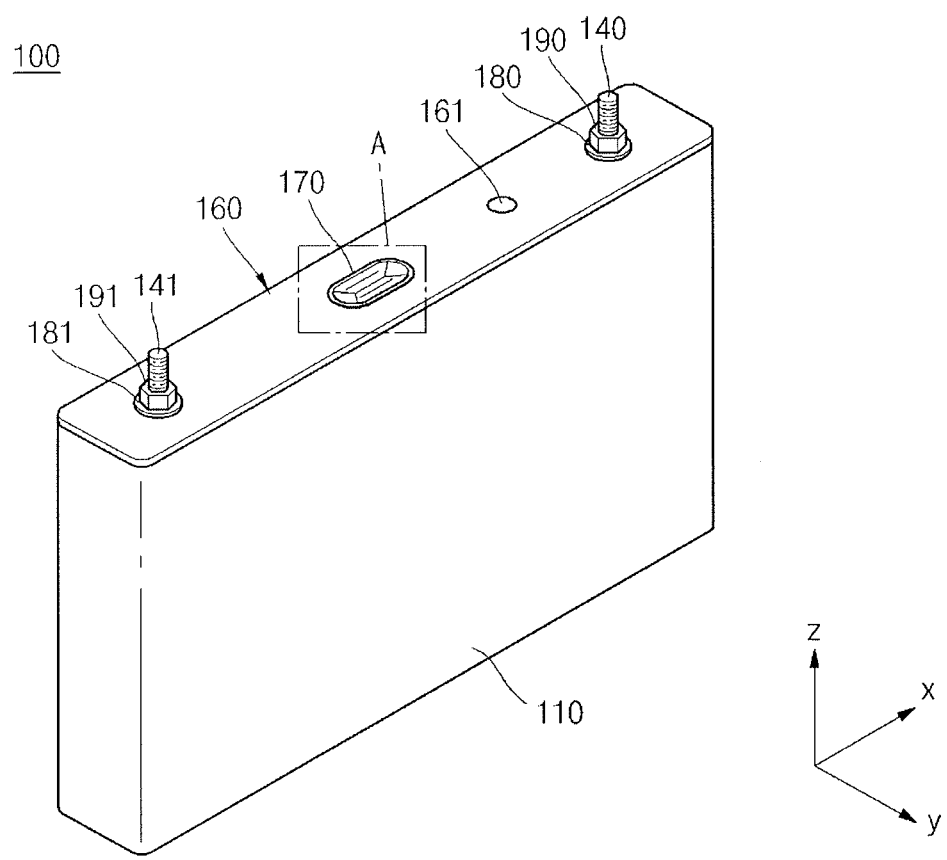
FIG. 1 illustrates a perspective view of a secondary battery according to a first embodiment.
Figure 2:
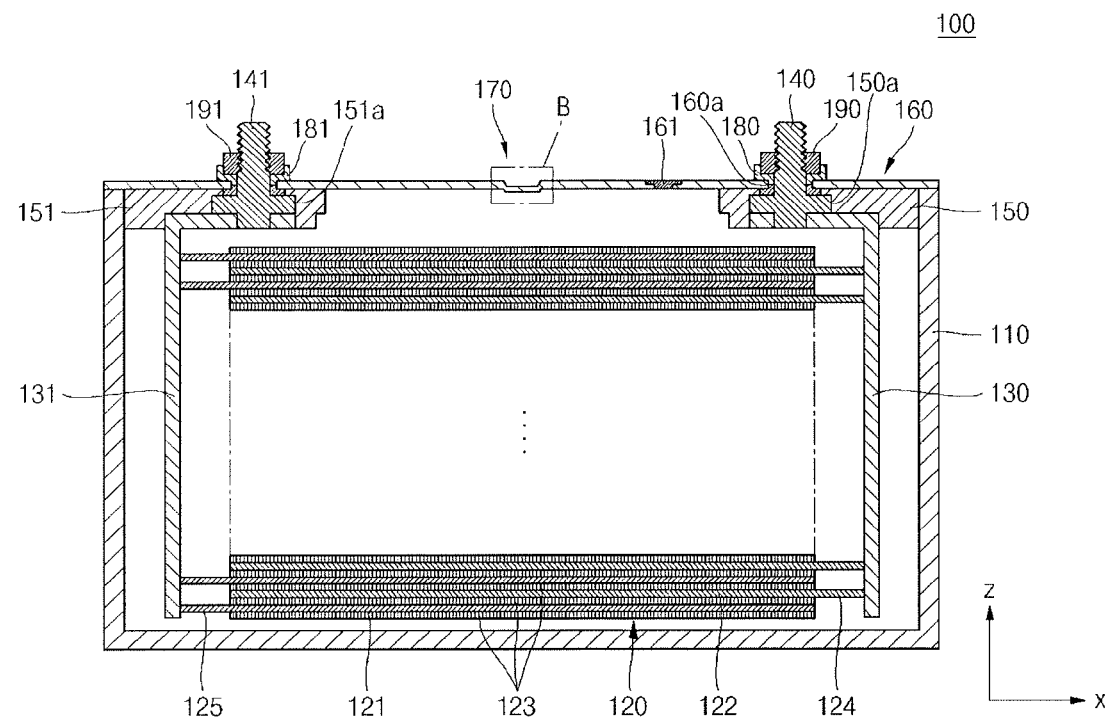
FIG. 2 illustrates a sectional view of the secondary battery according to the first embodiment.
Figure 3:
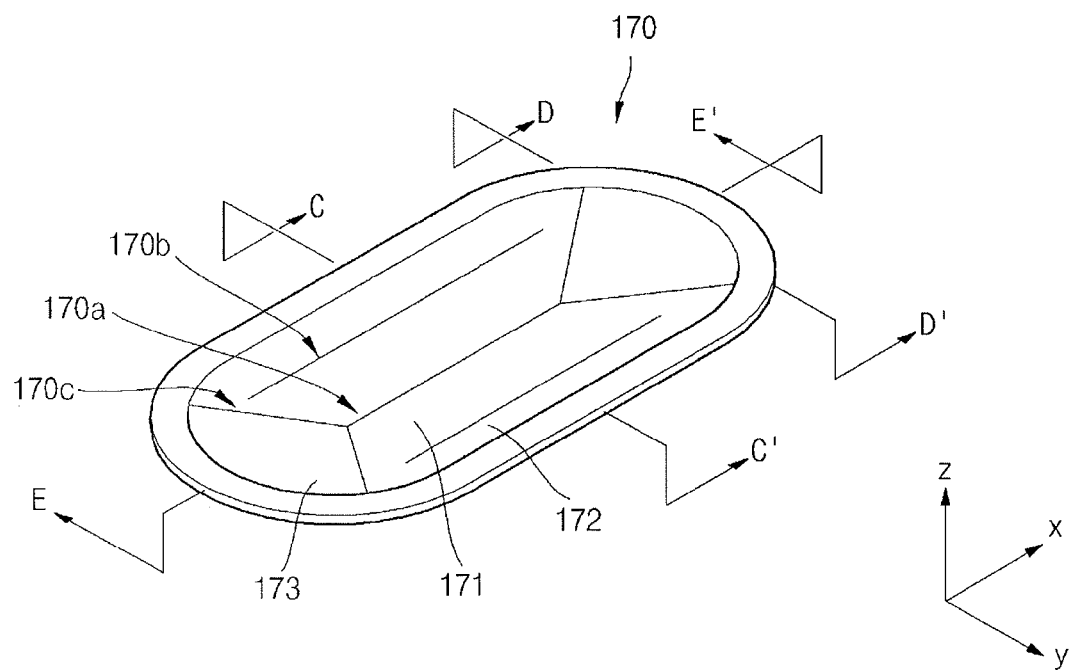
FIG. 3 illustrates a partially enlarged view of a portion A of FIG. 1.

FIG. 1 illustrates a perspective view of a secondary battery according to the first embodiment. FIG. 2 illustrates a sectional view of the secondary battery according to the first embodiment. FIG. 3 illustrates a partially enlarged view of a portion A of FIG. 1.

Referring to FIGS. 1 through 3, a secondary battery 100 according to the first embodiment may include a case 110, an electrode assembly 120, collector plates 130 and 131, first insulating members 150 and 151, electrode terminals 140 and 141, a cap plate 160, a safety vent 170, and second insulating members 180 and 181. The secondary battery 100 may also include nuts 190 and 191 coupled to the electrode terminals 140 and 141.

The case 110 may have a hexagonal shape or other shapes. A space for receiving the electrode assembly 120 and electrolyte may be defined in the case 110. The case 110 may be formed of, e.g., aluminum, aluminum alloy, a material plated with a conductive metal such as nickel, etc.

The electrode assembly 120 may be disposed in the case 110. The electrode assembly 120 may include a positive electrode plate 121, a negative electrode plate 122, and a separator 123 disposed between the positive electrode plate 121 and the negative electrode plate 122. The electrode assembly 120 may have a shape in which the positive electrode plate 121, the negative electrode plate 122, and the separator 123, which are stacked together, are spirally wound in a jelly-roll type.

For convenience of explanation, one electrode assembly 120 is described as being provided within the case 110, but embodiments are not limited thereto. For example, a plurality of electrode assemblies may be provided.

The electrode assembly 120 may include uncoated portions 124, 125 arranged at ends of the case 110. A pair of uncoated portions 124, 125 may be provided (e.g., the uncoated portion 125 for making a connection to the positive electrode layer 121 being provided at one end of the electrode assembly 120, and the uncoated portion 124 for making a connection to the negative electrode layer 122 being provided at the other end of the electrode assembly 120).

The collector plates 130 and 131 may be respectively coupled to the electrode assembly 120. The collector plates 130 and 131 may be coupled from a lateral side direction of each of the uncoated portions 124, 125. One of the collector plates, e.g., collector plate 130, may be connected to the uncoated portion 124 of the negative electrode plate 122, and another of the collector plates, e.g., collector plate 131, may be connected to the uncoated portion 125 of the positive electrode plate 121. The collector plates 130 and 131 may be respectively connected to the uncoated portions 124, 125 through, e.g., welding. Upper portions of the collector plates 130 and 131 may be bent, and the bent upper portions may be respectively connected to the electrode terminals 140 and 141 to define paths in which current for charging/discharging of the electrode assembly 120 flows.

The electrode terminals 140 and 141 may be provided as a pair, and may be respectively coupled to the collector plates 130 and 131. The electrode terminals 140 and 141 may be coupled to the collector plates 130 and 131 through, e.g., welding. The electrode terminals 140 and 141 may be coupled to the bent upper portions of the collector plates 130 and 131. The electrode terminals 140 and 141 may protrude upward from the cap plate 160. The electrode terminals 140 and 141 may have a male screw thread on portions thereof that protrude upward from the cap plate 160. The nuts 190 and 191 may be respectively coupled to the upper portions of the electrode terminals 140 and 141 fix the electrode terminals 140 and 141 to the cap plate 160.

The first insulating members 150 and 151 may be respectively disposed on the collector plates 130 and 131. The first insulating members 150 and 151 may be disposed between the collector plates 130 and 131 and the cap plate 160. The first insulating members 150 and 151 may electrically separate the collector plates 130 and 131 from the cap plate 160. The first insulating members 150 and 151 may have respective terminal holes 150a and 151a therein to allow the electrode terminals 140 and 141 to pass through the first insulating members 150 and 151 and electrically connect to the respective electrode terminals 140 and 141 and then the collector plates 130 and 131.

The cap plate 160 may be disposed on the case 110 and coupled to the case 110. The cap plate 160 may seal the case 110 to prevent electrolyte within the case 110 from leaking. The cap plate 160 may have a terminal hole 160a therein to allow the electrode terminal 140 to pass through the terminal hole 160a and protrude upwardly. A similar hole may be provided for the electrode terminal 141. The cap plate 160 may include an injection plug 161 that plugs an injection hole after the electrolyte is injected.

The safety vent 170 may be in the cap plate 160. The safety vent 170 may be disposed at an approximately central portion of the cap plate 160. When the case 110 has an internal pressure greater than a reference pressure, e.g., as a result of generating a gas within the case 110 due to overcharging, the safety vent 170 may be opened sooner than other portions of the case, thereby exhausting the gas at the safety vent 170. Thus, the safety vent 170 may reduce the danger of explosion (e.g., due to an increase of the internal pressure of the secondary battery 100).

The safety vent 170 may have a concave shape. In the example shown in FIG. 3, the safety vent 170 protrudes toward the inside of the case 110. In an embodiment, the safety vent 170 has a concave shape such that a central portion of the safety vent 170 protrudes toward the space defined within the case 110. A region of the safety vent 170 that protrudes farthest toward the space may be about midway between peripheral edges of the safety vent 170. For example, the region of the safety vent 170 that protrudes farthest toward the space may be generally at the midline of the safety vent 170, although manufacturing and/or assembly tolerances may be such that the region of the safety vent 170 that protrudes farthest toward the space is offset from the midline of the safety vent 170.

When the case 110 has the internal pressure less than the reference pressure (at which the safety vent operates), the safety vent 170 may maintained in position facing the inside of the case 110. The concave shape of the safety vent 170 may prevent the safety vent 170 from being swelled during the swelling of the case 110. Thus, fatigue fracture of the safety vent 170 due to the swelling may be prevented. In addition, situations in which cracks occur in the safety vent 170 or the opening pressure of the safety vent 170 is decreased may be prevented.

Detailed constitutions and operations of the safety vent 170 will be described below. With reference to the first embodiment, the safety vent 170 (which is concave so as to project toward the inside of the case 110) may include a plurality of grooves 170a, 170b, and 170c defined in a top surface of the cap plate 160, as described in further detail below. According to the first embodiment, the safety vent 170 may be formed with first and second plates 171, 172 with angles therebetween, or each of the first plates and second plates 171, 172 may be curved to form a smooth gull-wing shape. According to other embodiments, fewer plates and/or grooves may be included, or additional plates and/or grooves may be included, e.g., the safety plate 170 may be formed with inner plates, outer plates, and midplates disposed between the inner and outer plates, and grooves may be located where each plate meets an adjacent plate.

The second insulating members 180 and 181 may be disposed between the respective electrode terminals 140 and 141 and the cap plate 160. The second insulating members 180 and 181 may electrically separate the cap plate 160 from the electrode terminals 140 and 141. The second insulating members 180 and 181 may be disposed on the cap plate 160, such that the second insulating members 180 and 181 electrically separate the nuts 190 and 191 from the cap plate 160 when the nuts 190 and 191 are coupled to the corresponding electrode terminals 140 and 141.

The nuts 190 and 191 may be coupled to the corresponding electrode terminals 140 and 141 from an upper direction of each of the electrode terminals 140 and 141. The nuts 190 and 191 may be coupled to screw threads of the corresponding electrode terminals 140 and 141 through screw threads disposed on inner surfaces of the nuts 190 and 191. The nuts 190 and 191 may be coupled to the electrode terminals 140 and 141 to fix the electrode terminals 140 and 141 to the cap plate 160, respectively. Thus, the electrode assembly 120 coupled to the electrode terminals 140 and 141 may be also fixed inside the case 110.

Hereinafter, constitutions and operations of the safety vent in the secondary battery according to the first embodiment will be described in detail.

Figure 4A:
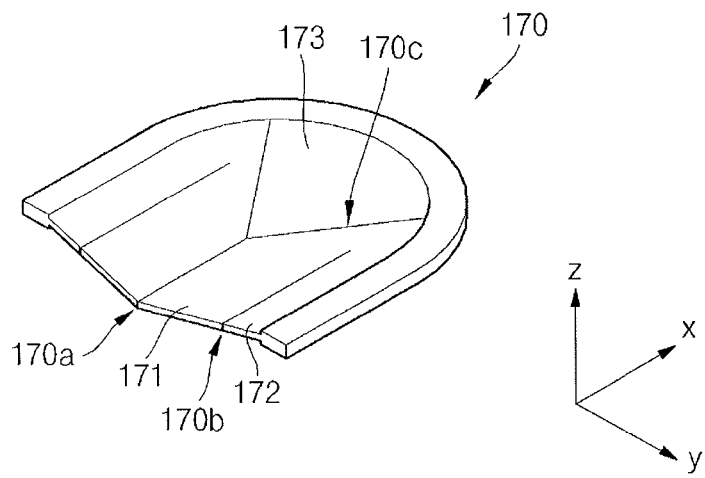
FIG. 4A illustrates a perspective view taken along line C-C' of FIG. 3.
Figure 4B:
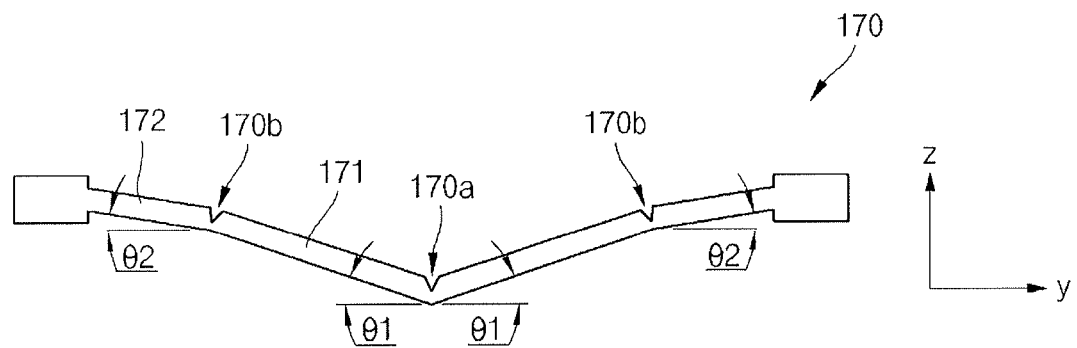
FIG. 4B illustrates a sectional view taken along line C-C' of FIG. 3.

FIG. 4A illustrates a perspective view taken along line C-C' of FIG. 3. FIG. 4B illustrates a sectional view taken along line C-C' of FIG. 3.

Referring to FIGS. 3, 4A, and 4B, the safety vent 170 used in the secondary battery 100 according to the first embodiment includes a pair of second plates 172 disposed on both edges along a length direction of the safety vent 170, a pair of first plates 171 inwardly bent from the second plates 172, and a pair of third plates 173 contacting the first plate 171 and the second plate 172 at end regions of the safety vent 170.

A first groove 170a may be defined in a region in which the first plates 171 contact each other. The first plates 171 may meet at an angle, the first groove 170a being located where the first plates 171 meet. The first groove 170a may extend in a first direction, e.g., a longitudinal direction of the safety vent 170. The first groove 170a may be defined in an approximately central portion with respect to a width of the safety vent 170. The first groove 170a and the second grooves 170b may have V-shapes, respectively. The first plates 171 may be inclined at a first angle θ1 with respect to the plane of the cap plate 160.

The second plates 172 may be disposed on both edges along the length direction of the safety vent 170. Referring to FIG. 4B, the second plates 172 may be inwardly inclined at a second angle θ2 with respect to a plane of the cap plate 160 to face the inside of the case 110. The first angle θ1 may be greater than the second angle θ2.

The first plates 171 may be inwardly bent (i.e., bent toward the interior of the secondary battery 100) from the second plates 172. Second grooves 170b[1] may be defined in regions in which the first plates 171 and the second plates 172 respectively contact each other. The second grooves 170b may extend in the first direction.

[1] swapped "first" and "second" terms for 170a, 170b, in order to correspond to the claims. See, e.g., claim 11.

The first plates 171 may be bent toward an inner space of the case 110, forming a V-shape. When sufficient internal pressure exists in the case 110, the internal pressure is applied to a central region of the first plates 171 having the first groove 170a therebetween. As a result, the first plates 171 ascend upward due to the internal pressure. Here, the first plates 171 form the V-shape facing the inner space of the case 110, such that the first plates 171 may endure an internal pressure that is less than the reference internal pressure (at which opening of the safety vent 170 occurs), while preventing the first plates 171 from being swelled at an internal pressure that is less than the reference internal pressure. Therefore, the safety vent 170 of the secondary battery 100 according to the first embodiment may prevent cracks from occurring in the grooves (e.g., the first groove 170a) as a result of fatigue fracture generated due to repeated swelling, and may prevent the opening pressure of the safety vent 170 from being lowered.

In an implementation, the first plates 171 may meet one another with an angle of $180°-2\theta_1$ therebetween, where the angle ($180°-2\theta_1$) is determined at an outer surface of the safety vent in an enclosed region of a V-shape, such that the vertex thereof points toward the battery interior. An angle of $180°-2\theta_2$ may be defined between the second plates 172, the angle ($180°-2\theta_2$) being determined at the outer surface of the safety vent, such that the second plates 172, when extended by an imaginary line to meet at a vertex, enclose a region of an inward-pointing V-shape that is a broader V than that formed by the first plates 171, i.e., the angle $180°-2\theta_1$ is less than the angle $180°-2\theta_2$ since $\theta_1$ is larger than $\theta_2$.

When the first angle θ1 is greater than the second angle θ2, the swelling of the first plates 171 may be reduced in a case where the internal pressure of the case 110 is applied to the portion in which the first groove 170a is defined. Thus, a reduction of the opening pressure of the safety vent 170 due to the fatigue fracture of the first plates 171 may be avoided.

Figure 5:
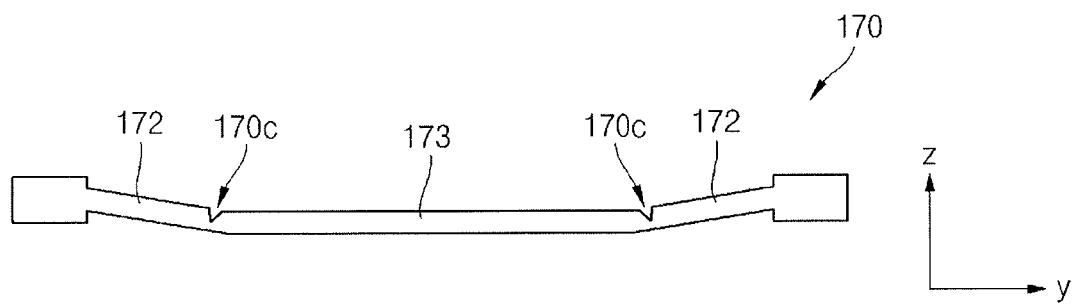
FIG. 5 illustrates a sectional view taken along line D-D' of FIG. 3.
Figure 6:
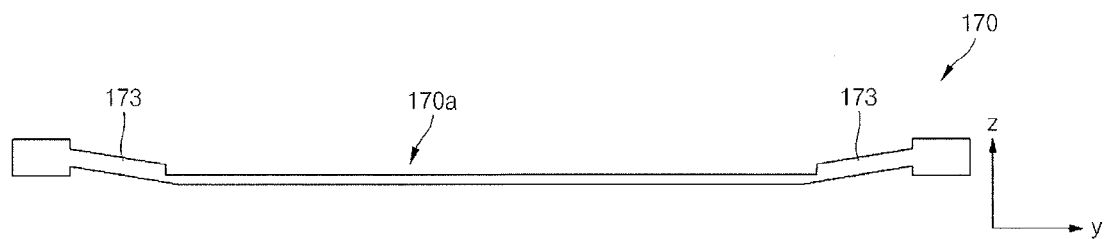
FIG. 6 illustrates a sectional view taken along line E-E' of FIG. 3.

FIG. 5 illustrates a sectional view taken along line D-D' of FIG. 3. FIG. 6 illustrates a sectional view taken along line E-E' of FIG. 3.

Referring to FIGS. 5 and 6, the third plate 173 is disposed along a width of the safety vent 170, in contact with the first plate 171 and the second plate 172. Third grooves 170c may be defined where the third plate 173 contacts the first plate 171 and the second plate 172. The third plate 173 may ascend when the internal pressure of the case 110 is increased, e.g., when the internal pressure exceeds the reference internal pressure.

As described above, in the secondary battery 100 according to the first embodiment, the safety vent 170 may be disposed on the cap plate 160, and the safety vent 170 may protrude toward the inside of the case 110 and may operate only at a desired reference internal pressure. Therefore, the safety vent 170 may prevent cracks from occurring in the grooves of the safety vent 170, such cracks resulting from fatigue fracture generated due to the swelling of the safety vent 170, and may prevent the opening pressure of the safety vent 170 from being lowered.

Hereinafter, constitutions of a secondary battery according to a second embodiment will be described.

Figure 7:
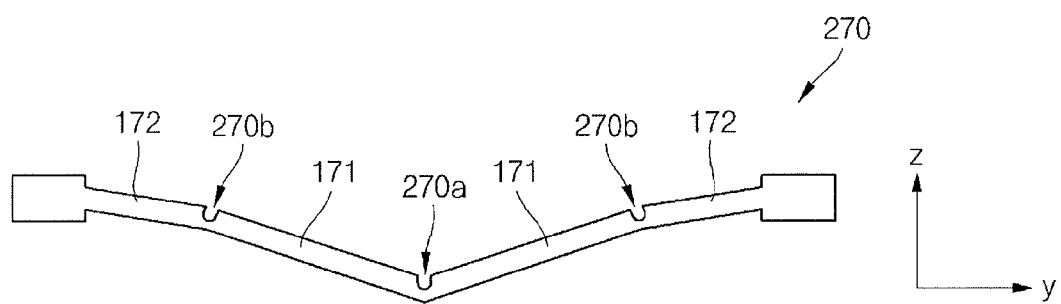
FIG. 7 illustrates a partial sectional view of a secondary battery according to a second embodiment.

FIG. 7 illustrates a partial sectional view of a secondary battery according to the second embodiment. Parts having the same constitution and operation as the foregoing embodiment will be designated by the same reference numerals, and thus, differences therebetween will be mainly described.

Referring to FIG. 7, the secondary battery according to the second embodiment includes a safety vent 270. The safety vent 270 may include first plates 171, second plates 172, and third plates (not shown in FIG. 7).

Sections constituting the safety vent 270 may be the same as those of the foregoing embodiment. However, each of second grooves 270b respectively defined between the first plates 171 and the second plates 172 has a U-shape. Also, a first groove 270a between the first plates 171, and third grooves (not shown) defined between the third plates and the first and second plates 171 and 172, have U-shapes, respectively. The first groove 270a, the second grooves 270b, and the third grooves may be increased in area due to the U-shapes. Thus, an opening pressure of the safety vent 270 may be reduced when compared to that of the foregoing embodiment. Also, it may be possible to variously set the opening pressure of the safety vent 270. Also, in this case, it may prevent cracks from occurring in the first through third grooves of the safety vent 270 as a result of fatigue fracture generated due to the swelling of the safety vent 270, and may prevent the opening pressure of the safety vent 270 from being lowered to than the reference internal pressure.

Hereinafter, constitutions of a secondary battery according to a third embodiment will be described.

Figure 8:
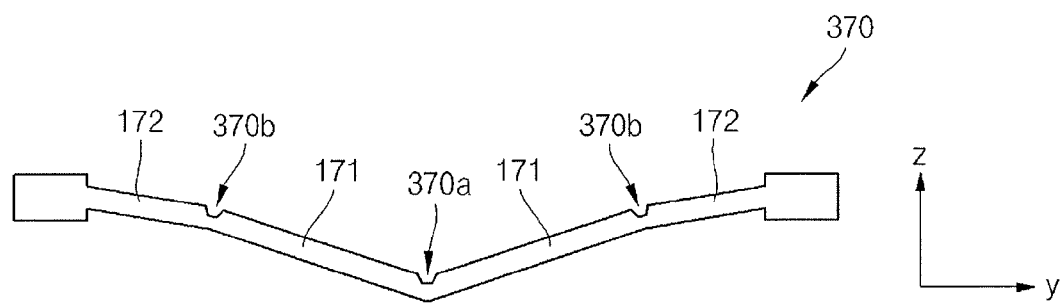
FIG. 8 illustrates a partial sectional view of a secondary battery according to a third embodiment.

FIG. 8 illustrates a partial sectional view of a secondary battery according to the third embodiment.

Referring to FIG. 8, the secondary battery according to the third embodiment includes a safety vent 370. The safety vent 370 includes first plates 171, second plates 172, and third plates (not shown).

Sections constituting the safety vent 370 are the same as those of the foregoing embodiments. However, second grooves 370b defined between the first plates 171 and the second plates 172, a first groove 370a between the first plates 171, and third grooves (not shown) defined between the third plate and the first and second plates 171 and 172 have trapezoidal sectional shapes, respectively. The first groove 370a, the second grooves 370b, and the third grooves may be increased in area due to the trapezoidal sectional shape. Thus, an opening pressure of the safety vent 370 may be reduced when compared to those of the foregoing embodiments. This may enable variously setting the opening pressure of the safety vent 370.

Hereinafter, constitutions of a secondary battery according to a fourth embodiment will be described.

Figure 9:
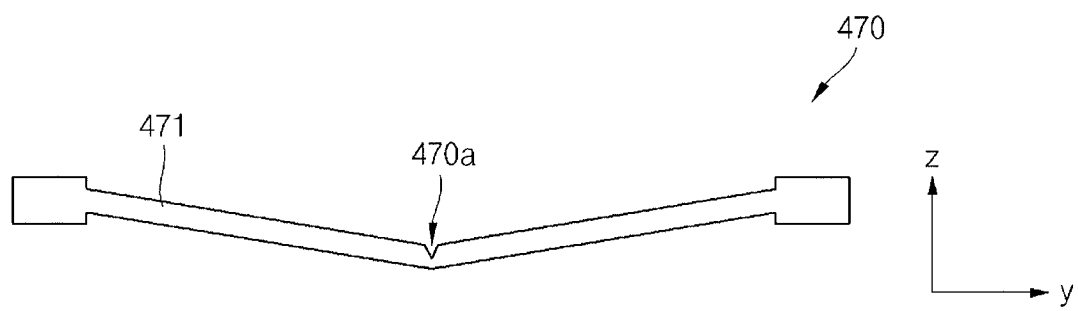
FIG. 9 illustrates a partial sectional view of a secondary battery according to a fourth embodiment.

FIG. 9 illustrates a partial sectional view of a secondary battery according to the fourth embodiment.

Referring to FIG. 9, the secondary battery according to the fourth embodiment includes a safety vent 470. The safety vent 470 includes plates 471, which meet at a groove 470a. The groove 470a is same with the first groove 370a of the first embodiment. The safety vent 470 is different from the first embodiment in that the safety vent 470 has no second plates or second grooves. This may enable easier fabrication of the safety vent 470.

Hereinafter, constitutions of a secondary battery according to a fifth embodiment will be described.

Figure 10:
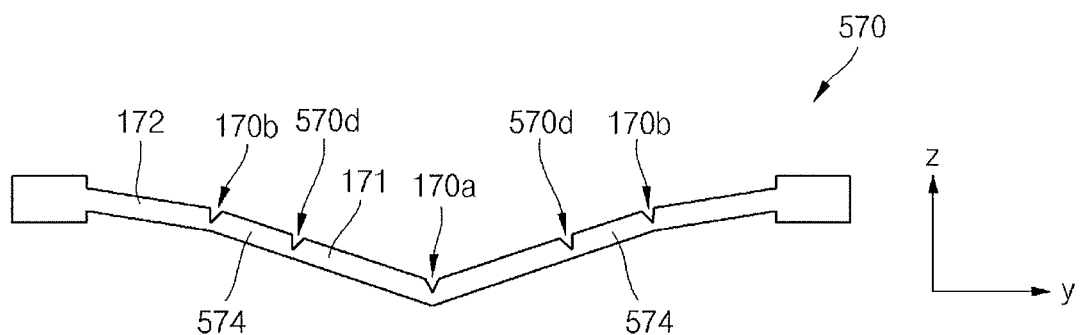
FIG. 10 illustrates a partial sectional view of a secondary battery according to a fifth embodiment.

FIG. 10 illustrates a partial sectional view of a secondary battery according to the fifth embodiment.

Referring to FIG. 10, the secondary battery according to the fifth embodiment includes a safety vent 570. In the cross-section shown in FIG. 10, the safety vent 570 includes the first plates 171, the second plates 172, and fourth plates 574.

A fourth groove 570d may be provided between each first plate 171 and each fourth plate 574. The safety vent 570 has more groove than the above-described embodiments, which may enable setting the opening pressure more easily.

By way of summation and review, a secondary battery may include an electrode assembly including a positive electrode plate, a negative electrode plate, and a separator between the positive and negative electrode plates, a case in which the electrode assembly together with electrolyte is received, and a cap plate mounted on the case. The secondary battery may generate excessive heat due to overcharge or may be burnt or exploded by an increase of an internal pressure when electrolyte is decomposed. Thus, a secondary battery having a structure capable of improving safety is important.

As described above, embodiments may provide a secondary battery capable of constantly maintaining an opening pressure of a safety vent. In secondary battery according to embodiments, when the safety vent is disposed on the cap plate, the safety vent may protrude toward the inside of the case and may be operated only at the desired reference internal pressure. Therefore, the safety vent may prevent the cracks from occurring in the grooves of the safety vent, such cracks being the result of fatigue fracture generated due to the swelling of the safety vent. The safety vent may also prevent the opening pressure of the safety vent from being lowered.

As described above, a secondary battery may include a case having an inner space therein, an electrode assembly inserted into the inner space of the case, a cap plate coupled to an upper portion of the case, and an electrode terminal coupled to the electrode assembly to protrude upward from the cap plate. The secondary battery may include a safety vent in one region of the cap plate, the safety vent being bent to face the inner space of the case. The safety vent may have a V-shape in section to face the case. The safety vent may have a thickness less than those of other regions of the cap plate. The safety vent may have at least one groove in a top surface thereof and be bent toward the inside of the case. The groove may have at least one shape of a U-shape, a V-shape, and a trapezoidal shape. The safety vent may include a pair of plates disposed on edge portions along a length direction of the safety vent and another pair of plates respectively bent therefrom to contact each other at a center with respect to a width of the safety vent. The plates may be inclined with respect to the cap plate. An inclined angle between the cap plate and each of the central plates may be less than an inclined angle between each of the outer plates and the cap plate. A groove may be defined in a region at which the central plates contact the outer second plates. A groove may be defined in a top surface of a region at which the plates contact each other. Additional plates contacting the central and outer plates may be disposed on both ends with respect to a length direction of the safety vent. A groove may be defined in each of top surfaces of portions at which the additional plates contact the central and outer plates.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery, comprising:
   a housing defining an interior space, the housing including a safety vent, the safety vent having a concave shape such that a central portion of the safety vent protrudes toward the space, a region of the safety vent that protrudes farthest toward the space being about midway between peripheral edges of the safety vent, wherein:

the safety vent includes an angled portion at the central portion, the angled portion including a first groove and plates at sides of the first groove, and each interior surface of the plates of the angled portion at one side of the first groove is inclined at an angle with respect to each interior surface of the plates of the angled portion at another side of the first groove.

2. The battery as claimed in claim 1, wherein:
the peripheral edges are part of a peripheral portion of the safety vent that encircles the central portion.

3. The battery as claimed in claim 2, wherein the first groove is disposed in an outer surface of the safety vent and extends in a first direction of the safety vent.

4. The battery as claimed in claim 2, wherein the first groove has a U-shape, a V-shape, or an inverted trapezoidal shape.

5. The battery as claimed in claim 2, wherein:
first regions of the safety vent extend laterally from the angled portion,
second regions of the safety vent extend from the first regions,
the first regions meet at the angled portion with a relatively small angle between the first regions, the relatively small angle being determined at an outer surface of the safety vent,
the second regions meet the first regions, and
a relatively large angle is between the second regions, the relatively small angle being less than the relatively large angle, the relatively large angle being determined at the outer surface of the safety vent.

6. The battery as claimed in claim 2, wherein:
first regions of the safety vent extend laterally from the angled portion, and
second regions of the safety vent extend laterally from the periphery of the safety vent towards central portion.

7. The battery as claimed in claim 6, wherein:
the first regions meet at the angled portion with a relatively small angle between the first regions, the relatively small angle being determined at an outer surface of the safety vent, and
the second regions have a relatively large angle between the second regions, the relatively large angle being determined at the outer surface of the safety vent, the relatively small angle being less than the relatively large angle.

8. The battery as claimed in claim 6, wherein respective second grooves are located at lateral portions of the second regions.

9. The battery as claimed in claim 8, wherein the second grooves have a U-shape, a V-shape, or an inverted trapezoidal shape.

10. The battery as claimed in claim 8, wherein:
the second grooves extend in a first direction of the safety vent, and
a first groove is located in the angled portion and extends in the first direction of the safety vent.

11. The battery as claimed in claim 10, wherein:
the second regions meet the first regions,
the second grooves are located where the second regions meet the first regions, and are disposed in an outer surface of the safety vent, and
the first groove is disposed in the outer surface of the safety vent.

12. The battery as claimed in claim 6, wherein the safety vent includes two end plates, each end plate joining ends of the first and second regions to the periphery of the safety vent.

13. The battery as claimed in claim 12, wherein:
a first groove is located in the angled portion,
respective second grooves are located at lateral portions of the second regions, and
the two end plates meet respective ends of the first groove.

14. The battery as claimed in claim 13, wherein the end plates do not meet the second grooves.

15. The battery as claimed in claim 6, wherein each of the first regions is substantially planar, and each of the second regions is substantially planar.

16. The battery as claimed in claim 6, wherein each of the first regions is curved, and each of the second regions is curved.

17. The battery as claimed in claim 1, wherein the safety vent has a crosssectional profile having a gull-wing shape, in which inner sections extend from the central portion, the inner sections being angled toward a periphery of the safety vent by a first angle, and outer sections extend from the inner sections to the periphery, the outer sections being angled toward the periphery by a second angle that is less than the first angle.

18. The battery as claimed in claim 17, wherein the inner sections and the outer sections have thicknesses less than a thickness of the periphery.

19. The battery as claimed in claim 1, wherein the housing includes a case and a cap plate, the safety vent being disposed in the cap plate, the cap plate closing an end of the case.

* * * * *